INVENTOR.
MERVILLE O. KROLL
BY
Dugger Brodbeck Johnson & Westman
ATTORNEYS

Feb. 8, 1966   M. O. KROLL   3,233,274
SWEEPING MACHINE DUST SEPARATOR APPARATUS
Filed Jan. 28, 1963   4 Sheets-Sheet 2

INVENTOR.
MERVILLE O. KROLL
BY
Dugger, Braddock, Johnson & Westman
ATTORNEYS

Feb. 8, 1966         M. O. KROLL         3,233,274
SWEEPING MACHINE DUST SEPARATOR APPARATUS
Filed Jan. 28, 1963         4 Sheets-Sheet 3

INVENTOR.
MERVILLE O. KROLL
BY
Dugger Johnson + Westman
ATTORNEYS

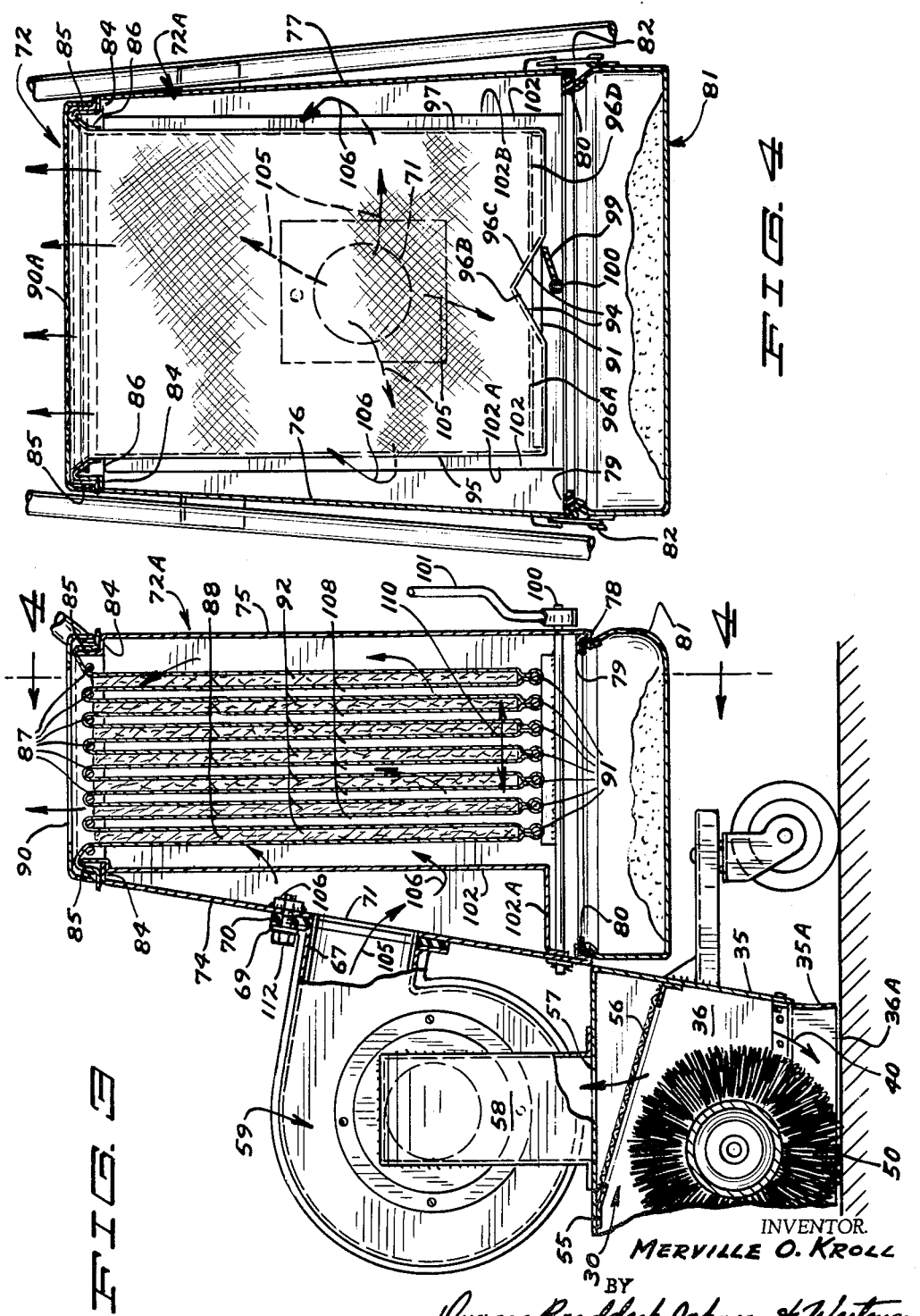

United States Patent Office 3,233,274
Patented Feb. 8, 1966

3,233,274
SWEEPING MACHINE DUST SEPARATOR
APPARATUS
Merville O. Kroll, Chaska, Minn., assignor to G. H. Tennant Company, Minneapolis, Minn., a corporation of Minnesota
Filed Jan. 28, 1963, Ser. No. 254,288
2 Claims. (Cl. 15—340)

This invention relates to improvements in floor maintenance machines and more specifically in sweeping machines. The invention is also directed to improvements in dust control system of the machine and in large capacity means for capturing dust-laden air, for filtering the dust from the air and collecting the dust. The invention relates to the type of and the location of air filtering and dust collecting adjuncts of the machines.

It is an object of the invention to provide an improved floor maintenance machine having a power driven floor working tool in an enclosure and provided with a vacuum appliance for withdrawing from such enclosure dust laden air raised by the tool during its operation; and to provide an improved air filtration system for removing the dust from the air and separately collecting the dust.

It is a further object of the invention to provide an improved floor maintenance machine having a suction blower thereon for collecting dust laden air raised by the machine and a filtering system including a housing mounted on operator guide handles of the machine that contains a plurality of depending filtering pockets through which the air is forced for separating the dust on the outer surfaces of the pockets, there being provision for easily separately collecting the filtered dust in a lower portion of the filtering system.

It is another object of the invention to provide an improved walk-behind power operated floor maintenance machine (such as a floor sweeper) having power driven operating tool or tools thereon (such as a brush) which normally raise dust and to provide a suction blower for collecting dust laden air raised by the operating tool or tools, and in such machine to provide a filtering system of an extremely high capacity whereby in a very small machine of the walk-behind type, large volumes of dust laden air may be collected and filtered and the filtered dust separately collected therein.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings in which corresponding numerals refer to the same parts and in which:

FIGURE 3 is a fragmentary vertical sectional view taken along the line and in the direction of arrows 3—3 of FIGURE 1;

FIGURE 4 is a fragmentary vertical sectional view taken along the line and in the direction of arrows 4—4 of FIGURE 3;

Figure 1:
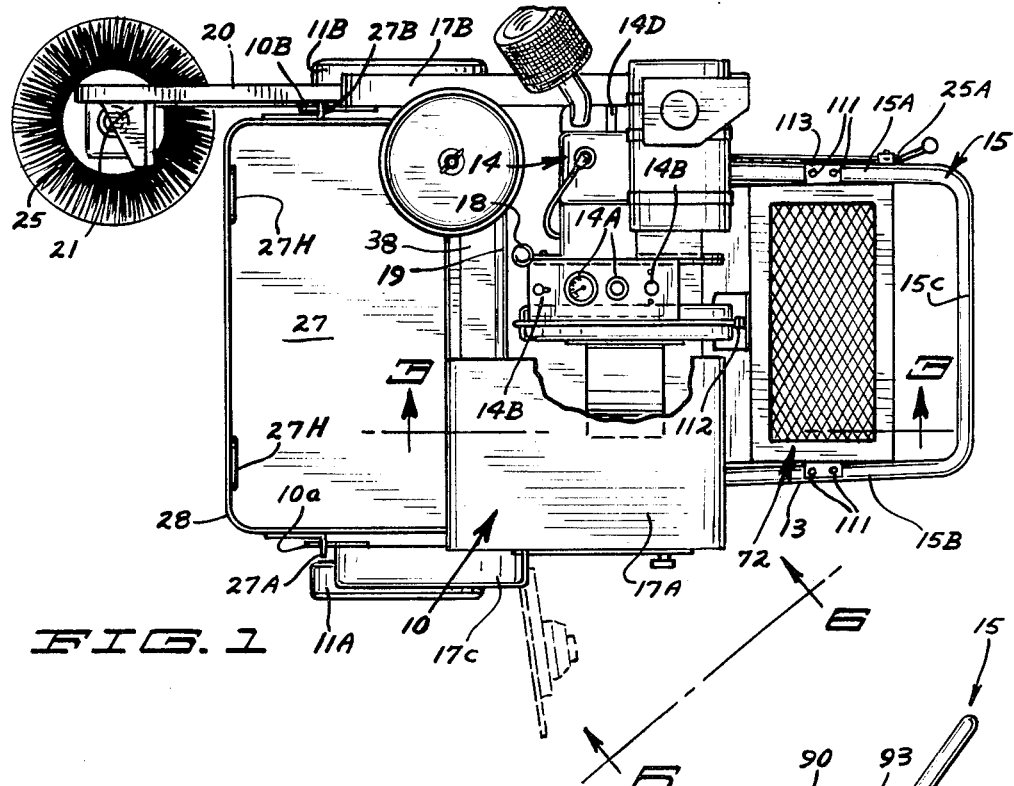
FIGURE 1 is a plan view of an exemplary floor maintenance machine embodying the improvements of the present invention.

Referring to the drawings, the sweeping machine comprises a frame, generally designated 10, having support and drive wheels 11A and 11B at the front end thereof. A rear wheel 12 is pivotally mounted by member 13 which in turn is attached to the central portion of the rear wall 35 of the frame. On the frame there is mounted an engine generally designated 14, engine instruments 14A and engine controls 14B, and U-shaped guide handle 15. The guide handle is fastened to the frame at 120 and extends rearwardly thereof, said handle having spaced-apart legs 15A and 15B which extend forwardly and downwardly to the machine frame, and a hand-hold 15C. Between the handle legs there is attached a dust filtration chamber assembly generally designated 72, 81.

The engine has a transverse engine shaft 14D on which there is keyed a combination type drive sheave 123 that is drivingly connected to the side brush 25 and the main rotary tool 50 which may be a sweeping brush, an abrasive tool, a polishing tool or etc. A sheave 121 is keyed on a transverse shaft 19 which is driven by a belt 122 movable into driven engagement with the combination drive sheave 123 through appropriate clutch mechanism 125, operated by control 25A on the guide handle. The above mentioned combination sheave, the driven connections, clutch mechanism and belt are for the most part located in housing 17B, other than for control 25A and the linkage (indicated by dotted line 126) from the control to the clutch mechanism. Likewise, the drive connections 127 from the shaft 19 to each of the front wheels 11A and 11B for rotating the wheels to propel the machine are within housing 17C and 17B respectively. However, it is to be understood that means for driving the wheels could be of the type for also selectively propelling the machine in a forward or a rearward direction. Control 25A on handle 15 is provided for starting and stopping the forward propulsion of the machine and for reversing the direction of drive if appropriate drive mechanism were provided.

Figure 2:
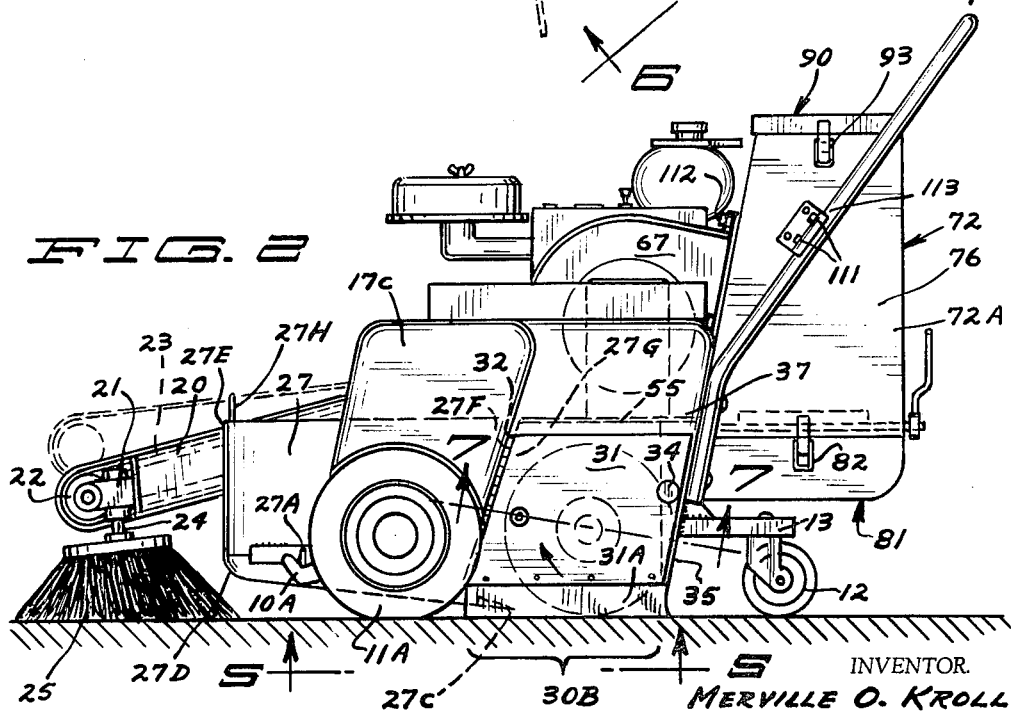
FIGURE 2 is a left side elevational view of the machine shown in FIGURE 1.

Upon the right side of the machine there is mounted, to be selectively pivoted from the solid line sweeping position of FIGURE 2 to the dotted line non-sweeping position, a forwardly extending housing arm 20 which at its forward end mounts a gear box 21 and curb brush 25. The arm also mounts an input pulley 22 drivingly connected through the gear box to the curb brush upright shaft 24, pulley 22 being driven by belt 23 which in turn is drivenly connected to the combination drive sheave on the engine shaft. Power is, of course, supplied by engine 14. Brush arm 20 and brush 25 can manually be lifted to the dotted line position shown in FIGURE 2 and through suitable connections to the frame (not shown) the brush will be retained in this position. In this position the belt 23 is slackened and stops rotation of the belt. The arm 20 is also manually movable back to the solid line position and retained in said solid line position. The brush 25 does not interfere with the forward withdrawal of the pan.

The two wheels 11A and 11B are forwardly directed and spaced apart and are drivingly connected to the engine. The machine framing is projected slightly forwardly of the wheels with spaced-apart forwardly projecting notched arms 10A and 10B. Between the arms 10A, 10B there is removably positioned a pan 27 for collecting swept debris. This pan 27 has side projections at 27A and 27B which hook upon the frame pieces 10A and 10B and hooks 129 on the top wall of the pan for hooking into slots 38B of the frame plate 38 and hence support the pan. The pan is entirely closed except for its rear face. Thus, the pan has a forwardly and slightly upwardly sloping bottom 27M extending from rear lip 27C over which debris is swept into the pan, thence forwardly to the rounded bottom front corner 27D and thence up the front wall to 27E where handles 27H—27H are provided. The pan top 27N then extends back almost level to 27F (adjacent plate 38) where it drops down and then extends back to edge 27G, which tucks into the implement enclosure (over bracket 30B, FIGURE 2). The front surface of the implement enclosure is in part defined by a flexible flap 38A that is attached to the depending flange portion 38E of curved front plate 38.

The implement enclosure of the machine, such as for example a sweeping enclosure 30, is that portion shown over the bracket 30B in FIGURE 2. It has an open bottom housing that includes top wall 55, back wall 35, right side wall 36 and left sidewall, which is door 31 mounted on hinge 32. The door is held closed by thumb screw 34. When this is loosened, the door may be swung from the closed solid line position shown in FIGURE 1 to the opened position in FIGURE 6. The front of the enclosure is actually an opening contiguous to the rearwardly facing opening of pan 27; there being provided on the frame flaps 38A to seal the wall 55 to the pan top and flaps 38G to seal to the pan sides when the pan is in place. The lower edges of each of these walls 31, 35 and 36 of the enclosure is provided with a flexible strip flashings, such as rubber flashings 31A, 35A and 36A. These are adjusted with reference to the machine height, so that they will normally extend almost to the level of the surface on which the machine moves.

The pan 27, for collecting swept debris, has its upper rear terminal edge portion 27G in contact with the flexible strip 38A (see FIGURE 6) and is mounted for withdrawal. The sidewalls of the pan 27 close against flexible strips 38G and 38G on either side of the opening into which the open rear face of the collection hopper 27 extends.

Figures 5, 6:
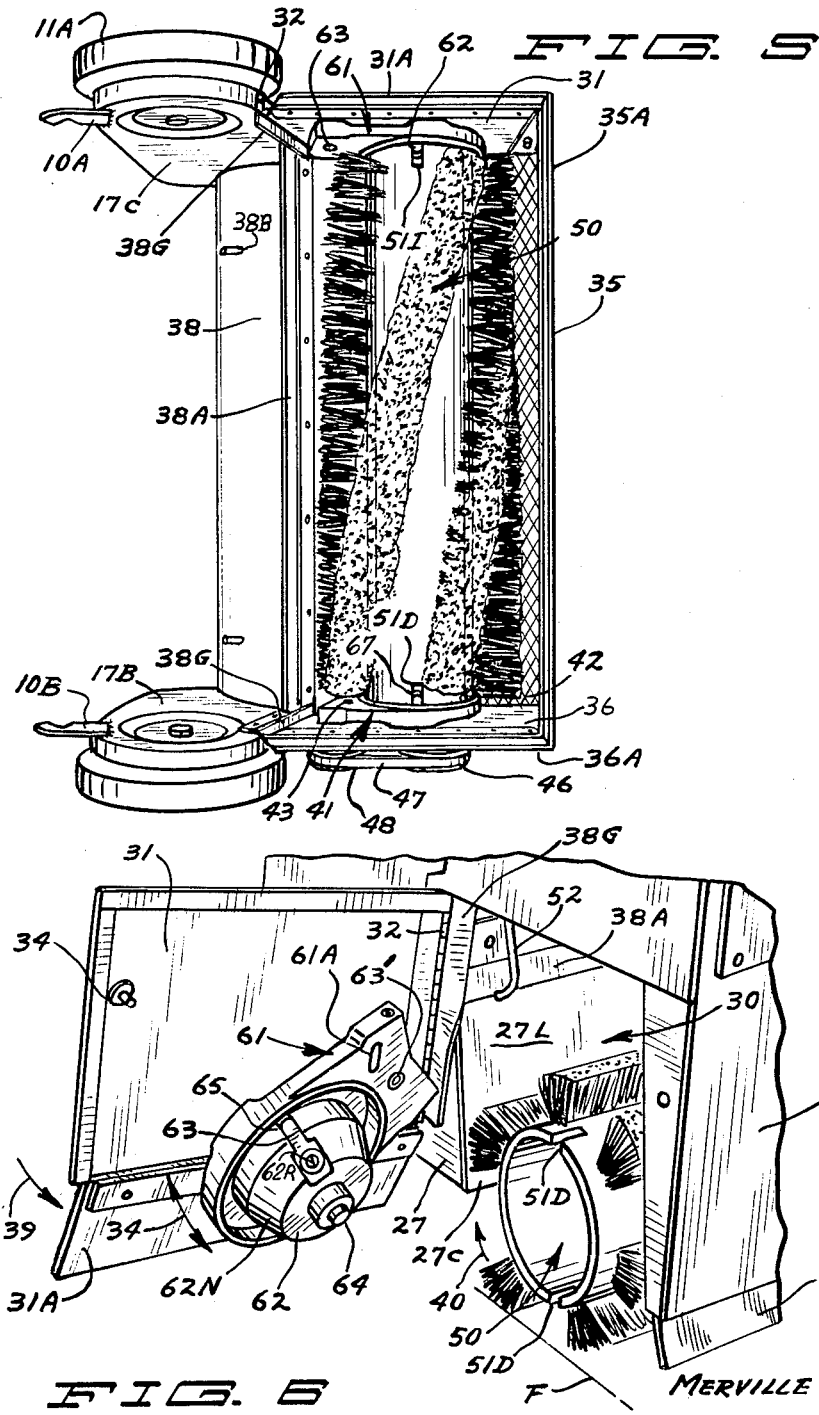
FIGURE 5 is an underside isometric view of a portion of the sweeping machine shown in FIGURE 3. This is a pictorial view looking upwardly in the direction of arrow 5—5 of FIGURE 2.
FIGURE 6 is a perspective view showing the access door of the sweeping chamber on the left side of the machine swung open, and with the cylindrical brush of the machine slightly withdrawn, as during replacement of the brush, this view being taken along the line and in the direction of arrows 6—6 of FIGURE 1 while looking slightly downward.
Figure 7:
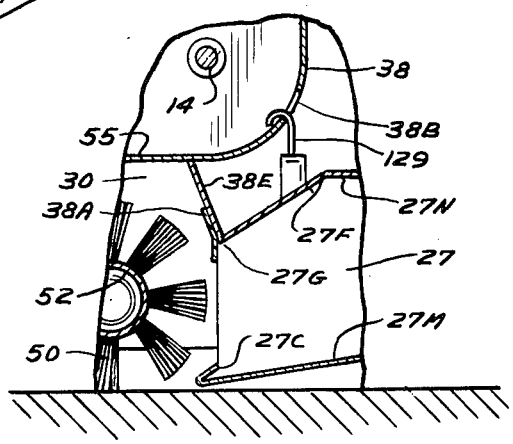
FIGURE 7 is a vertical cross sectional view illustrating the hooking attachment of the top of the pan to the frame.

The rotary floor maintenance implement, such as sweeping brush 50, in normal rotation as shown by arrow 40 of FIGURE 6, will convey debris into the open rear face of the collection hopper 27. The rear part of the collection hopper 27 is shown in FIGURE 6, and it will be noted that it has a rear opening 27L, into which the implement, such as brush 50 sweeps.

At each sidewall 31 and 36 of the sweeping enclosure there are swinging mandrel mounting arms generally designated 61 (left side; door mounted; idler mandrel) and 41 (right side; frame mounted; drive mandrel) for engaging the ends of the cylindrical implement, here illustrated as the brush generally designated 50, to rotatably support and drive the same. The arms 41 and 61 each have mandrels keyed to the implement.

Figure 8:
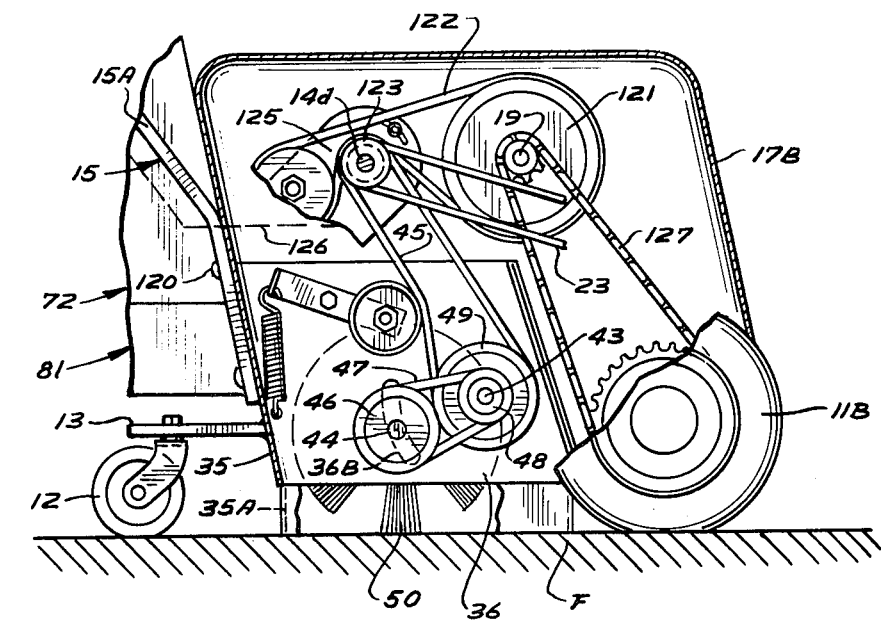
FIGURE 8 is a fragmentary vertical sectional view illustrating the front wheel drive; side arm brush drive and the main brush drive.

The cylindrical working tool, here illustrated as brush 50, is supported to extend transversely and is mounted for limited up and down movement. The supporting devices and mounting thereof are best shown in FIGURES 5, 6 and 8. Referring to these figures, the machine frame, which also constitutes the working enclosure for the tool, has on the right sidewall 36, a pivot 43 that mounts the radius arm casting, generally designated 41, for arcuate swinging movement. On the door 31, there is provided a pivot 63 which supports a radius arm casting, generally designated 61, that is oppositely faced but otherwise precisely similar to radius arm casting 41. Casting 61 likewise can swing arcuately up and down. As previously noted, the door 31 can swing open on its hinge, and when thus swung open as shown in FIGURE 6, the radius arm casting 61 is carried with the door to be withdrawn from the rotating working tool generally designated 50. The tool 50 can then be adjusted or replaced.

On the radius arm casting 41 there is journaled a drive shaft 44 which carries a mandrel (not shown) that is attached to the shaft so that it will turn when the shaft is rotated. The shaft 44 is extended through an arcuate slot 36B in sidewall 36 and may have a plate arcuately movable therewith for sealing the slot. The mandrel on casting 41 is provided with a key 67 extendable into a slot 51D on the adjacent end of the tubular body 52 of the working tool.

The shaft 44 is provided with an adjustable pulley 46 which is driven by the belt 47 from an idler pulley 48–49 that is journaled on the pin 43, adequate lubrication being provided for this pulley. The pulley 49 is driven by the belt 45 from the combination drive sheave on the engine shaft of the machine while pulley 48 drives belt 47. Accordingly, when the drive 45–49 inclusive is actuated, the shaft 44 is rotated, and this will rotate the mandrel on casting 41 which will accordingly rotate the cylindrical tool 50.

With the door 31 open, and the tool 50 pushed back into place so that its far end is on the mandrel on casting 41, the near end of tool 50 will then rest upon the floor F adjacent the door.

The door 31 is open, being swung on its hinge 32. It carries the pivot 63 on which the radius casting 61 (identical with the radius casting 41 but oppositely faced) is arcuately swingably mounted. This casting rotatably mounts shaft 64. The shaft 64 is keyed to the idler mandrel generally designated 62. This idler mandrel has a distinctly cone-shaped nose at 62N, so as to facilitate its entrance into the end of the tubular body 52 of the tool 50 when door 31 is swung shut. This tubular body 50 is likewise provided with a key slot 51I at the idler end, in order to ensure rotation of the idler mandrel 62. When the door 31 is swung shut it brings the conically tapered nose 62N of the mandrel 62 into the tubular body 52 of the tool 50. The mandrel 62 is provided with a flexible key 63 fastened to a sloping surface 62N of the mandrel which is so oriented that the free end of the key 63 will project outwardly generally at an angle to the axis of the mandrel. The rubber-bar key 63 is held in place in a slot 65 in the mandrel by a screw or rivet 62R.

After the brush is mounted on the mandrels, the castings 41, 61 may be pivoted to move brush 50 between a sweeping position and a raised non-sweeping position through the provision of transverse rod 52 which at either end is hooked to extend into a slot 61A in the respective casting, the rod being mounted in the enclosure and operated to selectively pivot the castings 41, 61 through a control 18 adjacent the engine. The control 18 is suitably connected to a radius arm welded rod 52 for pivoting said rod about a transverse axis to pivot said castings about pivots 43, 63 to raise the brush and retain it in a raised condition, but upon moving the control in the other direction permit the castings to pivot so that the brush engages the floor.

Referring now to FIGURES 1–4, the implement enclosure has a top wall 55, FIGURE 3, and an inclined screen 56 which extends across the full width between the sidewalls of the enclosures and from the back wall 35 of the enclosure, thence forwardly to the top wall 55. The rotation of the implement 50 is in the direction of arrow 40, and most of the swept debris will be swept forwardly (or to the left as shown in FIGURE 3) and thence over the lip 27C of the debris receiving pan 27, see FIG- URE 2. The implement enclosure is arranged to be under slight negative pressure and for this purpose there is introduced an opening 57 in the top wall 55, said opening being connected by means of inlet duct 58 to the inlet of a blower 59, which is power driven from the engine 14. The blower has an outlet horn 67 terminating in a flange 69 that is faced with soft gasket material at 70 that forms a fluid seal with the adjacent separator wall. As a result, air is withdrawn from the implement enclosure in which the implement 50 rotates, but large objects are not permitted to pass into the opening 57 because they are screened out by the screen 56. Where the implement is of abrasive construction, such as a sanding drum, steel wool drum, or a sweeping or polishing brush, a considerable amount of finally divided solids will be raised by action of the implement 50. The heavier portions of these solids will be swept forward into the pan 27 whereas the finer particles will be entrained in air and drawn upwardly by the air stream moving into and through the enclosure under skirts 35A, 36A and 31A, and thence the dust laden air is drawn into the inlet 58 of the blower 59 and after passing through the blower, such dust laden air is discharged through the gasketed flange 69 and into an inlet opening 71 of a solid-air separator, generally designated 72.

The solid-air separator 72 is a box composed of a metal sleeve 72A, a removable pan bottom 81 and a removable screened top cover 90. The sleeve 72A is composed of steeply, forwardly and downwardly slanted front wall 74, a rear wall 75, and side walls 76 and 77. The bottom edge of the container is reverse folded as at 78 and the reverse fold has an inwardly flange 79 so as to provide a seat for a gasket 80. A removable pan 81 is provided, this pan being open at the top and shaped so that its upper peripheral edge seals against the gasket 80. The pan is held in place by suspension buckles 82—82. When the buckles are loosened, the pan can be dropped down for emptying.

The upper surface or top of the container 72 is inturned at the top flange 84, and then extended upwardly at the flange 85, thus forming a seat all the way around the top of the thus-formed opening. The metal at 85 is then rolled back on a curve and extended inwardly and downwardly and finally downwardly. This forms an inwardly slanted mouth at the upper end of sleeve 72A. In the inwardly and downwardly sloping surfaces 86 on the upper ends of the sidewalls 76, 77 there are provided spaced-apart slots into which the ends of a plurality of bars 87—87 of stiff rod may be placed for suspending the filter medium, as will be described.

The filter is composed of a plurality of flat, thin pockets of filtering material, in which flexible, preferably plastic woven material of open weave is provided for separating the pocket walls. This filter construction, has been described in co-pending application, Serial No. 137,864, filed September 13, 1961, now U.S. Patent No. 3,160,908, granted Dec. 16, 1964. The several filtering pockets, here designated as the pockets 88, are fastened together at their upper ends where they pass over the bars 87 and at their side edges and thus form a complete filter wall at the level of bars 87. This wall is of filter cloth and extends out and over and then down around flange 85 and is provided with a hem and a draw string which is pulled tight and seats on flange 84. The cover 90 having a down-turned edge and a screened opening 90a in its upper surface that when in place is directly above the thus formed multi-pocket filter. The cover seats down on the filter cloth barrier where it passes over the curve connecting flanges 85 and 86 and thus seals it tightly and the down-turned edges of cover 90 cover and hold in the draw-string tied edge seated on flange 84. The cover is held in place by a plurality of downwardly extending buckles 93.

Each of the filter pockets thus is open at the top and opens up through the filter wall. The space between the pockets is supported by bars 87, which hold the pockets apart. The walls of the pockets are separated by the woven plastic separators 92, which are open-woven pads that are flexible in the plane of the pad and flexible transversely and so open woven as not materially to obstruct flow of air in the plane of the pad. Air thus entering through the walls of the pockets can pass upwardly in the plane of the open woven pad and hence out through the pocket upper open end. The pocket walls are cut away to form a shallow notch as at 94, see FIGURE 4, and a line of stitching is provided as at 95 along the left edge of the pocket, thence along the lower edge 96A, 96B, 96C and 96D, and thence up along the right edge of each of the pockets as at 97. This leaves a hem in which is placed the bar 91, one in each pocket. Each bar is exposed so that each of the bars can be contacted by a radially extending flange 99 on shaker shaft 100 which is pivoted in the front wall 74 and the rear wall 75 of the container. The shaker shaft is provided with a handle 101 on the outside by means of which it can be rotated for bringing the flange 99 into knocking contact with the bars 91 to shake and elevate the bars. This flexes the pads 92, wrinkles the pocket walls 88 and dislodges dust accumulating on the outsides of the pockets. Thus, the dust dislodged falls downwardly into the pan 81.

Within the housing 72 there is a vertical baffle 102 which is fastened to the flange 84 at the top and has a forwardly extending portion 102A that reaches to and fastens onto the inside of the front wall 74. The side edges of the baffle 102 do not extend all the way to the side walls 76 and 77 of the sleeve 72A, but terminate at edges 102A and 102B, thereby providing a space through which air can flow around the sides of the baffle 102. The incoming dust-laden air thus travels via arrows 105 through the opening 71, and hitting baffle 102 divides and flows via arrows 106 around the side edges 102A and 102B of the baffle 102, whereupon the air is distributed into the spaces 108 between the pockets. The air flows inwardly into the spaces between the pockets at the edges and the bottoms of the pockets. The air, which is dust-laden, then passes through the filter cloth of which the pockets are composed and the dust is filtered out, and the clean air, inside the pocket passes up through the open-woven separator until it reaches the open pocket mouth at the barrier (where the pockets are all fastened together to form a wall) at rods 87. The air then passes out of the pockets and through the screened opening of cover 90.

It will be noted that each of the pockets are free to swing back and forth in the direction of the double arrow 110 as shown in FIGURE 3. The free-swinging movement (of particularly the lower parts) of the pockets, which is due to vehicle starts and stops and general motion of the vehicle, helps to dislodge dust from the outer surfaces of the pockets. In addition, actuation of the handle 101 will also shake, lift and deflect the pockets, thereby dislodging the dirt therefrom.

The entire filter chamber 72 is supported from the handle 15 and flange 69 of the blower. Thus brackets 113 removably fastened to the side walls 76 and 77 and fastened to the handle pieces 15A and 15B are thus fastened by screws 111. Also, the upper portion of flange 69 is slotted and a fastening screw 112 passes therethrough into a reinforcement 106 on the inside of wall 74.

To be mentioned is that if desired, the handle 101 of the shaker structure may be removed and in place thereof a motor mounted on sleeve 72. In such a case, the motor would be connected to rod 100 to operate the shaker mechanism in a manner similar to that disclosed in co-pending application, Serial No. 137,864, now U.S. Patent No. 3,160,908.

It is also to be understood that a plurality of transversely extending, upwardly and forwardly curved louvers (not shown) may be mounted on cover 90 over aperture 90A to direct the air exhausting through aperture 90A in a forwardly and upwardly direction, or else such louvers may be substituted for the screen in aperture 90A. Such louvers can be used where it is objectional to having air discharge just in front of the operator.

As many widely apparently different embodiments of this invention may be made without departing from the spirit and scope thereof, it is to be understood that I do not limit myself to the specific embodiments disclosed herein.

What I claim is:

1. In a floor maintenance machine having a frame, wheels for supporting the frame, power means on the frame drivingly connected to at least one of said wheels, a handle connected to the frame to project rearwardly therefrom for gripping by an operator for guiding the machine, the frame having an open bottom enclosure thereon, a cylindrical work implement rotatably supported in said enclosure on an axis generally transversely of the frame, a suction blower on the frame connected to said enclosure for inducing a negative pressure therein and having an outlet, the improvement comprising a solid-air separator attached to said handle to at least in part depend therefrom and rearwardly disposed from the frame, said separator including a housing having an inlet connected to the outlet of said suction blower for receiving dust laden air from the blower, said housing comprising an upright sleeve having a closure pan detachably secured at the bottom, and an aperture cover detachably secured at the top, support means within the housing adjacent the top, and a plurality of open-topped filter pockets having their upper edges held on the support means so as to be suspended downwardly in pocket configuration from the support means, the tops of said pockets being attached together so as together to form a sheet through which the pockets open upwardly, said sheet extending entirely across the housing, said sheet being connected to the housing at the level of the cover, means within each of the pockets to hold the walls thereof in spaced relation, and baffle means mounted within the housing for directing the flow of dust laden air in the housing so that the flow is distributed and reaches the exterior surfaces of the pockets for passage through said pockets and thence upwardly in the pocket and out through the apertured cover.

2. In a mobile sweeping machine mounted for movement over a surface, a frame, said frame having an opened bottom enclosure for a power driven implement, a floor maintenance implement rotatably mounted in said enclosure, power means on the frame drivingly connected to said implement to rotate it, a suction blower on the frame drivenly connected to said power means and fluidly connected to said enclosure for inducting a negative pressure therein, and having an outlet, a guide handle having spaced apart members connected to said frame and projecting rearwardly therefrom, the improvement comprising an upright housing having a transverse front wall, a transverse rear wall and side walls, said walls being shaped and joined together to have the side walls diverge from one another in a downward direction, a top outlet opening and a bottom opening, said front wall having an inlet between said top opening and bottom opening and connected to the blower outlet for receiving dust laden air from the blower, a closure pan connected to said housing for collecting the dust falling through said bottom opening, deformable filter means mounted in said housing between said top opening and inlet such that the dust laden air moving to the top opening passes therethrough for separating the dust from the air as the air flows from the housing inlet to the top opening, said filter means including a plurality of depending filter pockets, said filter pockets each having oppositely disposed, generally transverse rectangular walls joined together at contiguous vertical and bottom edge portions, the vertical edge portions being spaced from the side walls, a baffle mounted in the housing between the inlet and the most closely adjacent filter pocket wall for directing the dust laden air passing through the housing inlet to flow toward the side walls, and means for attaching said housing to the handle members to at least in part depend therefrom and at least in part disposed rearwardly of said frame.

References Cited by the Examiner

UNITED STATES PATENTS

| | | | |
|---|---|---|---|
| 1,183,952 | 5/1916 | Chapman | 15—350 |
| 1,421,958 | 7/1922 | Kirby | 15—349 X |
| 1,500,128 | 7/1924 | Harrison | 55—500 X |
| 1,579,809 | 4/1926 | Clarkson-Jones | 15—49 |
| 2,196,839 | 4/1940 | Seng | 55—300 |
| 2,507,042 | 5/1950 | Osborn | 15—352 X |
| 2,519,741 | 8/1950 | Caughey | 15—352 |
| 2,661,493 | 12/1953 | Joy | 15—350 |
| 2,678,462 | 5/1954 | Lisom et al. | 15—349 |
| 2,701,377 | 2/1955 | Luksch et al. | 15—349 X |
| 2,765,483 | 10/1956 | Le Blanc | 15—49 |
| 2,823,762 | 2/1958 | Bunnell | 55—296 X |
| 2,859,461 | 11/1958 | Machovec | 15—340 X |
| 2,972,159 | 2/1961 | Swanson et al. | 15—340 |
| 2,985,905 | 5/1961 | Caufield | 15—353 |
| 3,006,128 | 10/1961 | Weiland | 15—353 X |
| 3,160,908 | 12/1964 | Peabody et al. | 15—352 X |

FOREIGN PATENTS

| | | |
|---|---|---|
| 640,696 | 5/1962 | Canada. |
| 778,919 | 1/1935 | France. |
| 1,170,843 | 9/1958 | France. |
| 444,165 | 1/1949 | Italy. |

OTHER REFERENCES

Bulletin No. 81.63, R-5-57, copyright 1957, by G. H. Tennant Co., subject: "Tennant Specialized Maintenance Equipment," 4 pages (copy in group 470), 15–340.

Bulletin No. 85.45, 10-57, copyright 1957, by G. H. Tennant Co., subject: "Tennant Model 40 Power Sweeper," 2 pages, 15–340 (copy in group 470).

WALTER A. SCHEEL, *Primary Examiner.*